(12) United States Patent
Arai et al.

(10) Patent No.: US 11,719,332 B2
(45) Date of Patent: Aug. 8, 2023

(54) MOTORCYCLE

(71) Applicant: Honda Motor Co., Ltd., Tokyo (JP)

(72) Inventors: Dai Arai, Tokyo (JP); Shinji Misawa, Tokyo (JP); Yukio Yokogawa, Tokyo (JP); Asuka Ito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 17/607,079

(22) PCT Filed: May 11, 2020

(86) PCT No.: PCT/JP2020/018791
§ 371 (c)(1),
(2) Date: Oct. 28, 2021

(87) PCT Pub. No.: WO2020/235371
PCT Pub. Date: Nov. 26, 2020

(65) Prior Publication Data
US 2022/0154822 A1    May 19, 2022

(30) Foreign Application Priority Data
May 17, 2019   (JP) ................................ 2019-094003

(51) Int. Cl.
*F16H 61/16*      (2006.01)
*B62J 45/415*     (2020.01)
(Continued)

(52) U.S. Cl.
CPC ............ *F16H 61/16* (2013.01); *B62J 45/415* (2020.02); *F16H 59/48* (2013.01); *F16H 59/50* (2013.01); *F16H 59/74* (2013.01)

(58) Field of Classification Search
CPC .......... F16H 59/48; F16H 59/50; F16H 59/74; F16H 61/16; F16H 2061/163
See application file for complete search history.

(56) References Cited

U.S. PATENT DOCUMENTS

2007/0186705 A1   8/2007   Suzuki
2008/0077301 A1   3/2008   Suzuki et al.
(Continued)

FOREIGN PATENT DOCUMENTS

CN   105593094 A   5/2016
CN   106164451 A   11/2016
(Continued)

OTHER PUBLICATIONS

International Search Report, issued in PCT/JP2020/018791, dated Jul. 28, 2020.
(Continued)

*Primary Examiner* — Edwin A Young
(74) *Attorney, Agent, or Firm* — Birch, Stewart, Kolasch & Birch, LLP

(57) ABSTRACT

A motorcycle includes a transmission, a first measuring unit, a second measuring unit, and a controller. The transmission is configured to automatically shift gears between a driving shaft and a driven shaft to transmit power from the driving shaft to the driven shaft. The first measuring unit is configured to measure the magnitude of a roll angle of a vehicle body. The second measuring unit is configured to measure the angular velocity of the roll angle of the vehicle body. The controller is configured to inhibit the transmission from shifting gears, based on the magnitude and the angular velocity of the roll angle. This configuration provides a motorcycle that enables gear shift control with more detailed response to a situation of a vehicle body.

20 Claims, 8 Drawing Sheets

(51) Int. Cl.
*F16H 59/48* (2006.01)
*F16H 59/50* (2006.01)
*F16H 59/74* (2006.01)

(56) References Cited

U.S. PATENT DOCUMENTS

| | | | |
|---|---|---|---|
| 2011/0166713 A1* | 7/2011 | Tsuji | G05D 1/0891 |
| | | | 700/279 |
| 2011/0191013 A1* | 8/2011 | Leeser | G16Z 99/00 |
| | | | 180/10 |
| 2012/0239264 A1 | 9/2012 | Kojima et al. | |
| 2016/0232802 A1 | 8/2016 | Nomura et al. | |
| 2017/0120901 A1 | 5/2017 | Igari | |
| 2018/0086169 A1 | 3/2018 | Iguchi et al. | |
| 2018/0328483 A1 | 11/2018 | Cheng | |

FOREIGN PATENT DOCUMENTS

| | | |
|---|---|---|
| CN | 108860444 A | 11/2018 |
| EP | 1 903 263 A1 | 3/2008 |
| EP | 3 053 799 A1 | 8/2016 |
| EP | 3 115 579 A1 | 1/2017 |
| EP | 3 300 999 A1 | 4/2018 |
| EP | 3 401 574 A1 | 11/2018 |
| EP | 3 895 972 A1 | 10/2021 |
| JP | 2007-218269 A | 8/2007 |
| JP | 2008-75761 A | 4/2008 |
| JP | 2010-121672 A | 6/2010 |
| JP | 2015-71330 A | 4/2015 |
| JP | 2017-178285 A | 10/2017 |
| JP | 2018-52309 A | 4/2018 |
| JP | 2018-189229 A | 11/2018 |
| WO | WO 2015/050038 A1 | 4/2015 |
| WO | WO 2015/133396 A1 | 9/2015 |
| WO | WO-2020162572 A1 * | 8/2020 .......... B62J 45/4151 |

OTHER PUBLICATIONS

Extended European Search Report for European Application No. 20808908.6, dated May 13, 2022.

* cited by examiner

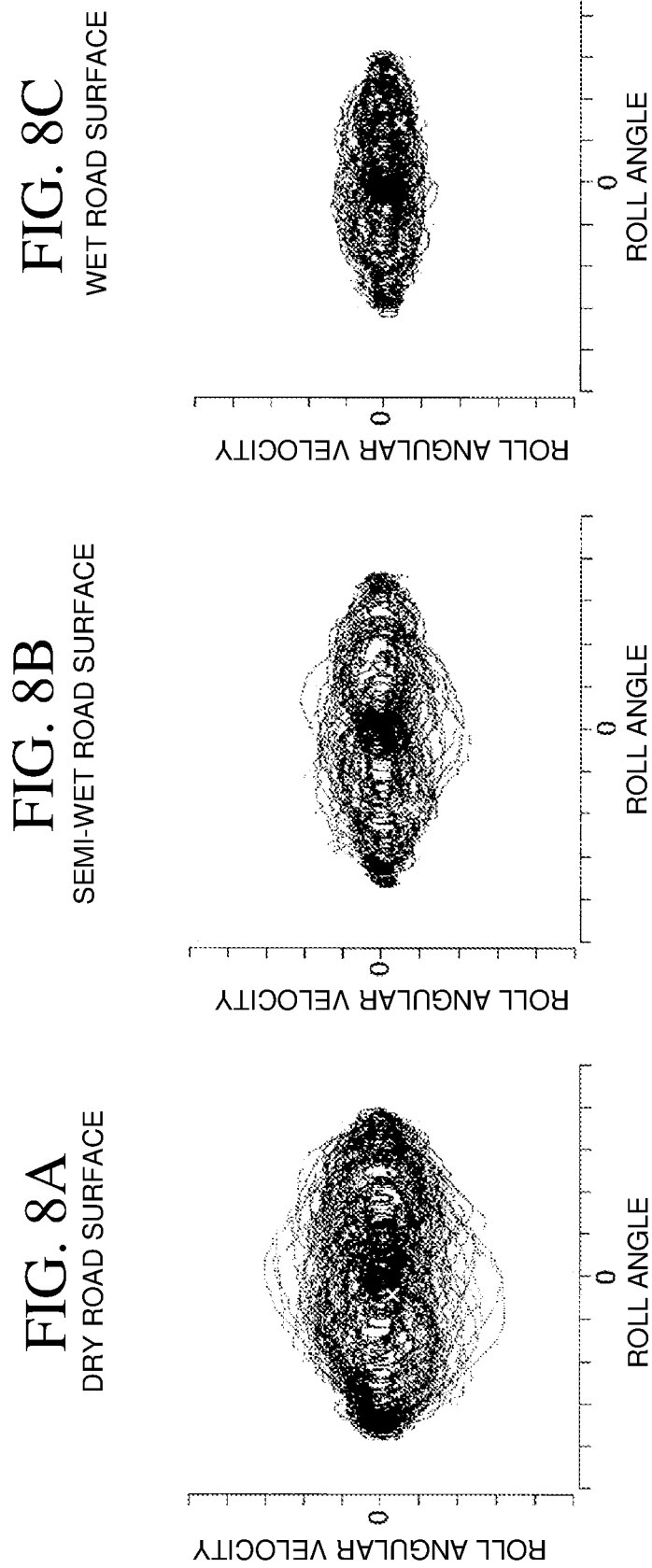
FIG. 8A DRY ROAD SURFACE
FIG. 8B SEMI-WET ROAD SURFACE
FIG. 8C WET ROAD SURFACE

MOTORCYCLE

FIELD

The present invention relates to a motorcycle equipped with a transmission and a controller configured to inhibit the transmission from shifting gears. The transmission automatically shifts gears between a driving shaft and a driven shaft to transmit power from the driving shaft to the driven shaft.

BACKGROUND

Patent literature 1 discloses a motorcycle. A transmission control system includes a roll angular velocity sensor for measuring an angular velocity of a roll angle of a vehicle body and includes a steering angular velocity sensor for measuring an angular velocity of a steering angle of a handlebar. At the time of winding driving, etc., in response to an angular velocity of the roll angle exceeding a reference value and an angular velocity of the steering angle exceeding a reference value, the transmission control system inhibits shifting gears. As a result, the driving force of the wheel is maintained constant during winding driving, whereby smooth turn movement can be performed.

CITATION LIST

Patent Literature

Patent literature 1: Japanese Unexamined Patent Application Laid-Open No. 2008-75761

BRIEF SUMMARY

Technical Problem

When the driving is changed from winding driving to straight driving, a driver wants to accelerate immediately after raising the vehicle body. Unfortunately, the transmission control system disclosed in Patent literature 1 does not allow shifting up because both angular velocity of the roll angle and the angular velocity of the steering angle exceed reference values immediately before the driving is changed to straight driving. This makes it difficult for the driver to accelerate the motorcycle as desired.

The present invention has been made in view of such a situation, and an object of the present invention is to provide a motorcycle that enables gear shift control with detailed response to the state of the vehicle body.

Solution to Problem

According to a first aspect of the present invention, a motorcycle includes a transmission, a first measuring unit, a second measuring unit, and a controller. The transmission is configured to automatically shift gears between a driving shaft and a driven shaft to transmit power from the driving shaft to the driven shaft. The first measuring unit is configured to measure the magnitude of a roll angle of a vehicle body. The second measuring unit is configured to measure the angular velocity of the roll angle of the vehicle body. The controller is configured to inhibit the transmission from shifting gears, based on the magnitude and the angular velocity of the roll angle. The controller is configured to allow shifting gears, upon detecting the angular velocity in a direction of returning from an inclined position to the neutral position of the vehicle body.

According to a second aspect, in addition to the configuration of the first aspect, the controller may be configured to inhibit the transmission from shifting gears, upon detecting the angular velocity in a direction of leaning from a neutral position of the vehicle body.

According to a third aspect, in addition to the configuration of the second aspect, the controller may be configured to inhibit the transmission from shifting gears, upon detecting the roll angle exceeding a threshold value in the direction of leaning from the neutral position of the vehicle body.

According to a fourth aspect, a motorcycle includes a transmission, a first measuring unit, a second measuring unit, and a controller. The transmission is configured to automatically shift gears between a driving shaft and a driven shaft to transmit power from the driving shaft to the driven shaft. The first measuring unit is configured to measure a magnitude of a roll angle of a vehicle body. A second measuring unit is configured to measure an angular velocity of the roll angle of the vehicle body. A controller is configured to inhibit the transmission from shifting gears, based on the magnitude and the angular velocity of the roll angle. The magnitude of the roll angle for inhibiting the transmission from shifting gears is changed in accordance with the magnitude of acceleration in an advance direction.

According to a fifth aspect, in addition to the configuration of any one of the first to the fourth aspects, the controller may be configured to inhibit the transmission from shifting gears, upon detecting the angular velocity exceeding a reference value in a direction of returning from an inclined position to the neutral position.

According to a sixth aspect, in addition to the configuration of any one of the first to the fifth aspects, the motorcycle may further include a storage device that stores a map which specifies the angular velocity for inhibiting shifting gears of the transmission with respect to each magnitude of the roll angle.

According to a seventh aspect, in addition to the configuration of any one of the first to the sixth aspects, the motorcycle may further include an inertial sensor that measures the magnitude and the angular velocity of the roll angle.

According to an eighth aspect, in addition to the configuration of any one of the first to the seventh aspects, the controller may be configured to change the degree of intervention of traction control, based on the roll angle and the angular velocity.

According to a ninth aspect, in addition to the configuration of any one of the first to the eighth aspects, the controller may be configured to cancel the inhibition of shifting gears, in a state in which an engine speed exceeds a predetermined value.

Advantageous Effects

In the first aspect, in addition to the angular velocity of the roll angle, the degree of the roll angle is also referred to, whereby the following states are distinguished: states of leaning to the right or the left (forming bank) and turning to the right or the left, and a state of returning from an inclined position to the neutral position. The transmission is thus controlled with detailed response to the state of the vehicle body. At the time of changing from winding driving to straight driving, or the like, when shifting up is performed in returning from the inclined position to the neutral position of the vehicle body, it is possible to accelerate the motorcycle immediately after winding driving. The driving feeling of the motorcycle is thus improved. A driver can enjoy riding more.

In the second aspect, at the time of entering a corner or turning to the right or the left, angular velocity of the roll angle is generated in the direction of leaning from the neutral position of the vehicle body. In such a case, shifting gears of the transmission is desired to be inhibited. Inhibiting shifting gears of the transmission at the time the vehicle body is leaned, improves driving feeling of the motorcycle.

In the third aspect, in response to the roll angle exceeding the threshold value in the direction of leaning from the neutral position of the vehicle body, the motorcycle is determined as being cornering. Shifting gears of the transmission is desired to be inhibited during cornering. Thus, shifting gears of the transmission is inhibited during cornering, whereby driving feeling of the motorcycle is improved.

In the fourth aspect, the transmission executes shifting up on the condition that the vehicle is ready to accelerate even during cornering. Thus, an excessive holding feeling is not caused by the speed stage.

In the fifth aspect, at the time of turning to the right or the left, for example, at the time the vehicle body is leaned from a right banked state to a left banked state, a great angular velocity exceeding the reference value is generated in returning from the inclined position to the neutral position of the vehicle body. Thus, by inhibiting the transmission from shifting gears in such a case, the driving feeling of the motorcycle is improved. A driver can enjoy riding more.

In the sixth aspect, the magnitude and the angular velocity of the roll angle for inhibiting shifting gears of the transmission are uniquely represented in numbers, which simplifies execution of control for inhibiting shifting gears of the transmission.

In the seventh aspect, inhibition of shifting gears is controlled based on information that is obtained by the single inertial sensor, whereby the configuration of a gear shift control unit can be simplified.

In the eighth aspect, the road surface condition can be predicted based on the magnitude and the angular velocity of the roll angle. The traction control is executed in accordance with the predicted road surface condition. This improves driving feeling of the motorcycle. A driver can enjoy riding more.

In the ninth aspect, although the conditions for inhibiting shifting gears are satisfied, shifting up is executed in the state in which the engine speed is high. This improves driving feeling of the motorcycle.

BRIEF DESCRIPTION OF DRAWINGS

FIGS. 8A to 8C are graphs showing two-dimensional distributions of a roll angle and an angular velocity of the roll angle actually measured on a dry road surface, a slightly wet road surface, and a wet road surface, which correspond to FIG. 6 (First Embodiment).

REFERENCE SIGNS LIST

Figure 1:
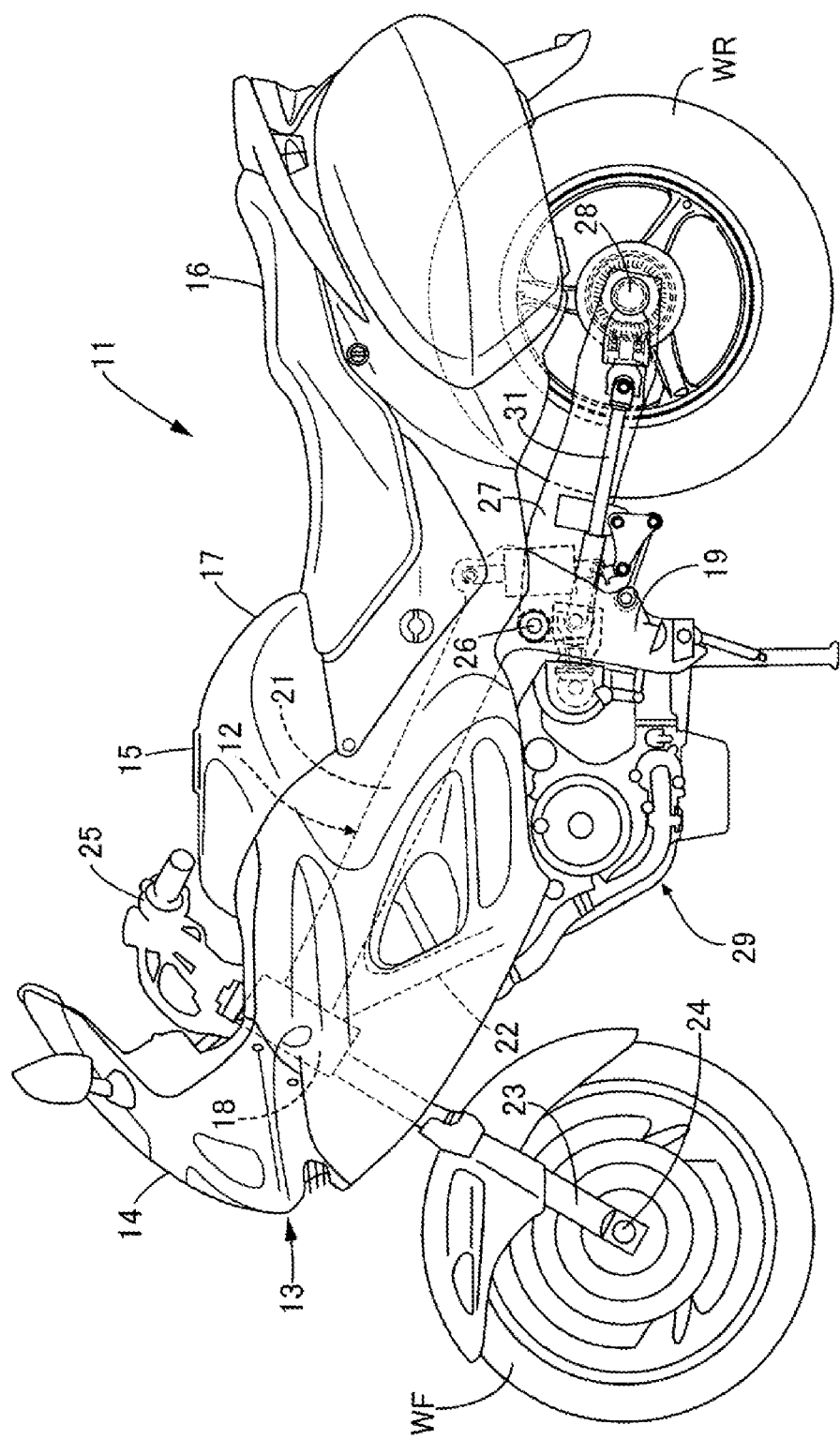
FIG. 1 is a side view schematically showing the whole motorcycle according to an embodiment of the present invention (First Embodiment).

11 . . . motorcycle
46 . . . transmission
47 . . . driving shaft (main shaft)
48 . . . driven shaft (countershaft)
111 . . . first measuring unit
112 . . . second measuring unit
115 . . . controller
116 . . . inertial sensor
124 . . . storage device
PL . . . reference value
PR . . . reference value
TH . . . threshold value

DETAILED DESCRIPTION

An embodiment of the present invention will be described with reference to the attached drawings hereinafter. Herein, an up-down direction, a front-rear direction, and a right-left direction of a vehicle body are defined based on a line of sight of a passenger riding on a motorcycle.

First Embodiment

FIG. 1 schematically shows the whole motorcycle according to an embodiment of the present invention. A motorcycle 11 includes a vehicle body frame 12 and a vehicle body cover 13 fitted to the vehicle body frame 12. The vehicle body cover 13 has a front cowl 14 and a tank cover 17. The front cowl 14 covers the vehicle body frame 12 from a front side. The tank cover 17 continues forward from an outer surface of a fuel tank 15 and is connected to a passenger seat 16 behind the fuel tank 15. The fuel tank 15 stores fuel. A passenger straddles the passenger seat 16 in order to drive the motorcycle 11.

The vehicle body frame 12 has a head pipe 18, paired right and left main frames 21, and a down frame 22. The main frames 21 extend downwardly rearward from the head pipe 18 and have pivot plates 19 at lower rear ends. The down frame 22 extends downward from the head pipe 18 under the main frames 21 and is then integrated with the main frames 21.

The head pipe 18 steerably supports a front fork 23. The front fork 23 supports a front wheel WF in a manner rotatable on an axle 24. A steering handlebar 25 is joined at the top of the front fork 24. A driver can hold right and left end grips of the steering handlebar 25 in order to drive the motorcycle 11.

A swing arm 27 is coupled to the vehicle body frame 12 on a rear side of the vehicle in a manner vertically swingable on a pivot 26. A rear wheel WR is supported at a rear end of the swing arm 27 in a manner rotatable on an axle 28. A power unit 29 for generating power to be transmitted to the rear wheel WR is mounted on the vehicle body frame 12 between the front wheel WF and the rear wheel WR. The power unit 29 is supported by being coupled to the down frame 22 and the main frame 21. Power of the power unit 29 is transmitted to the rear wheel WR via a drive shaft 31.

Figure 2:
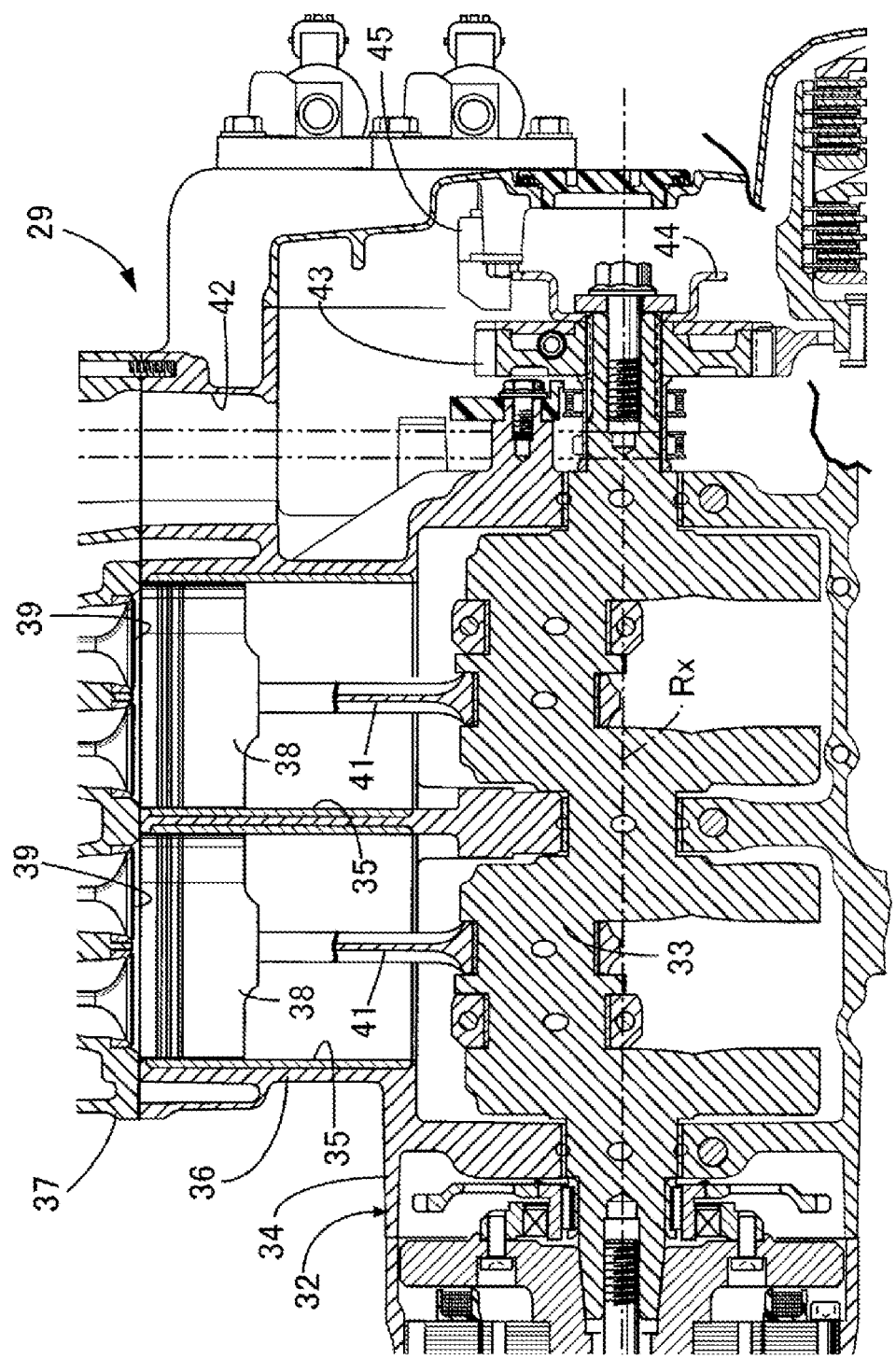
FIG. 2 is an enlarged sectional view of one bank cut at a cross section containing a rotation axis of a crankshaft and a cylinder axis of a V-engine (First Embodiment).

The power unit 29 includes a V-engine having a front bank and a rear bank, in which the front bank is positioned forward, and the rear bank is positioned rearward of the front bank, in the state of being mounted on the vehicle body frame 12. As shown in FIG. 2, an engine 32 includes a crankcase 34, a cylinder block 36, and a cylinder head 37. The crankcase 34 rotatably supports a crankshaft 33 that is shared by the front bank and the rear bank. The cylinder block 36 is joined to the crankcase 34 with respect to each of the front bank and the rear bank to define cylinder bores 35. The cylinder head 37 is joined to the cylinder block 36 to close the cylinder bores 35. A piston 38 is contained in the cylinder bore 35 in a linearly reciprocatable manner. A combustion chamber 39 is defined between the piston 38 and the cylinder head 37. Intake, compression, and combustion of air-fuel mixture, and discharge of exhaust gas, are repeated in the combustion chamber 39. In this manner, the linear reciprocation of the piston 38 is induced based on combustion of air-fuel mixture.

The piston 38 is connected to a connecting rod 41 that is coupled to the crankshaft 33. The linear reciprocation of the piston 38 is converted into rotation movement of the crankshaft 33 by the action of the crank. An end of the crankshaft 33 protrudes from the crankcase 34 into a cam chain chamber 42. A driving gear 43 is fixed to the end of the crankshaft 33 in the cam chain chamber 42.

A pulser ring 44 is fixed to the driving gear 43 in a manner coaxially with a rotation axis Rx of the crankshaft 33. The pulser ring 44 is formed with reluctors at an equal interval along the outer circumference. The reluctor faces a pulser sensor 45 that measures the number of rotation (per minute) of the crankshaft 33 based on a pulse signal generated by the reluctor.

Figure 3:
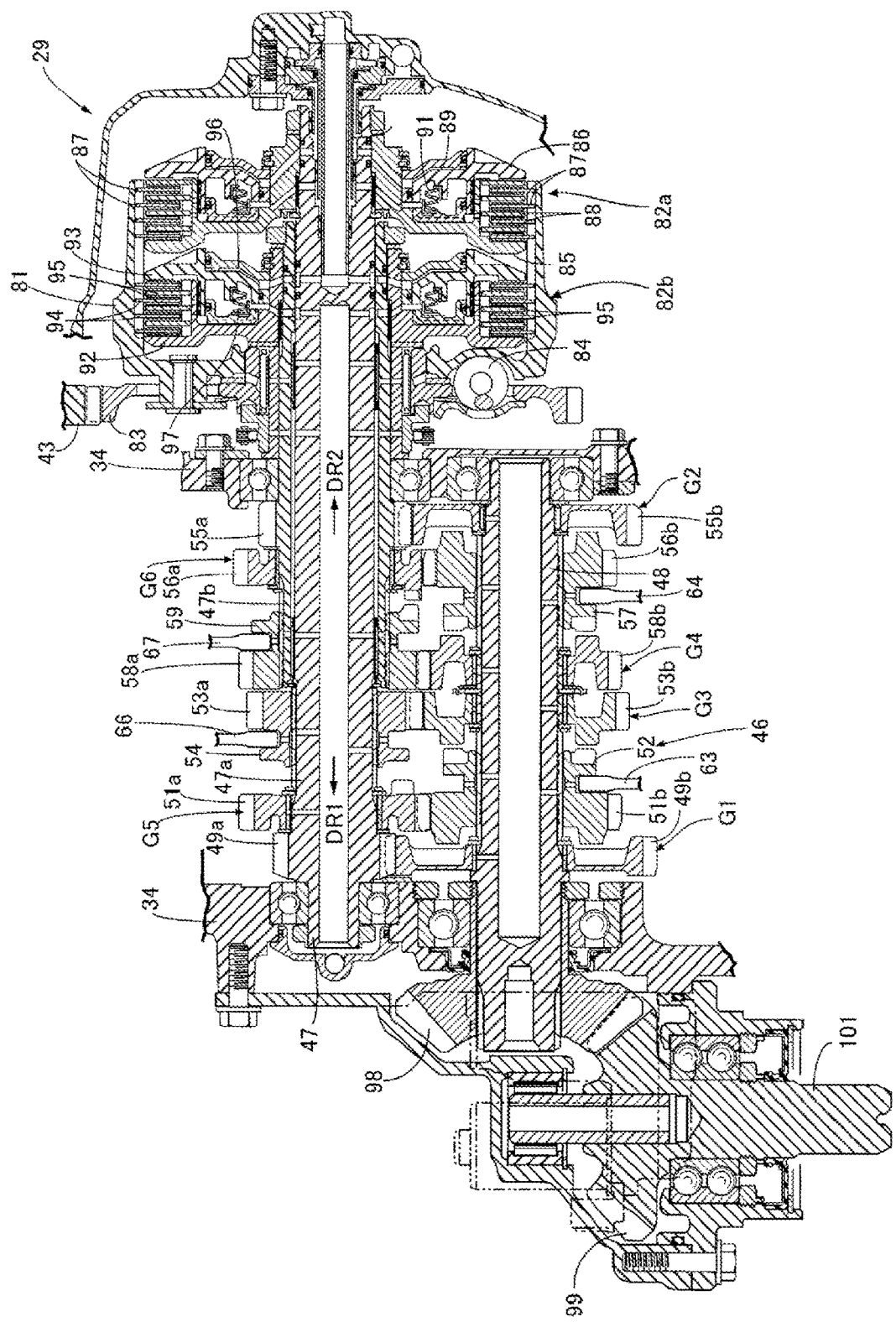
FIG. 3 is an enlarged sectional view of a transmission cut at a cross section containing shaft centers of a main shaft and a countershaft (First Embodiment).

As shown in FIG. 3, the power unit 29 includes a transmission 46 that is assembled in the crankcase 34 and that transmits power of the crankshaft 33 to the drive shaft 31. The transmission 46 includes a main shaft (driving shaft) 47 and a countershaft (driven shaft) 48. The main shaft 47 is supported by the crankcase 34 in a manner rotatable on an axis parallel the rotation axis Rx of the crankshaft 33. The countershaft 48 is supported by the crankcase 34 in a manner rotatable on an axis parallel to the axis of the main shaft 47. Gear trains of multiple speed stages that are selectively establishable are arranged between the main shaft 47 and the countershaft 48. The gear trains include a first-speed gear train G1, a second-speed gear train G2, a third-speed gear train G3, a fourth-speed gear train G4, a fifth-speed gear train G5, and a sixth-speed gear train G6.

The main shaft 47 is composed of an inner shaft 47a and a sleeve 47b. The inner shaft 47a is supported by the crankcase 34 in an axially rotatable manner. The sleeve 47b is coaxially fitted to the inner shaft 47a in a manner rotatable relative to the inner shaft 47a.

The first-speed gear train G1 includes a driving gear 49a and a driven gear 49b. The driving gear 49a is coaxially fixed to the inner shaft 47a. The driven gear 49b is coaxially fitted to the countershaft 48 in a relatively rotatable manner and meshes with the driving gear 49a. The driving gear 49a is integrally formed with the inner shaft 47a into one body. The driven gear 49b is coupled to the countershaft 48 in a manner relatively non-displaceable in the axial direction of the countershaft 48.

The fifth-speed gear train G5 includes a driving gear 51a and a driven gear 51b. The driving gear 51a is coaxially fitted to the inner shaft 47a in a relatively rotatable manner. The driven gear 51b is coaxially joined to the countershaft 48 in a relatively non-rotatable manner and meshes with the driving gear 51a. The driving gear 51a is supported by the inner shaft 47a in a manner non-displaceable in the axial direction of the inner shaft 47a. The driven gear 51b is joined to a first shifter 52 that is joined to the countershaft 48 by a spline in a manner relatively displaceable in the axial direction. Upon moving in a first direction DR1 from a neutral position, the first shifter 52 is coupled to the driven gear 49b of the first-speed gear train G1 by its dowel. This causes transmission of power from the inner shaft 47a to the countershaft 48 via the first-speed gear train G1. Thus, the first speed stage is established.

The third-speed gear train G3 includes a driving gear 53a and a driven gear 53b. The driving gear 53a is coaxially joined to the inner shaft 47a in a relatively non-rotatable manner. The driven gear 53b is coaxially fitted to the countershaft 48 in a relatively rotatable manner. The driving gear 53a is joined to a second shifter 54 that is joined to the inner shaft 47a by a spline in a manner relatively displaceable in the axial direction. The driven gear 53b is coupled to the countershaft 48 in a manner relatively non-displaceable in the axial direction of the countershaft 48. Upon moving in the first direction DR1 from an initial position, the second shifter 54 is coupled to the driving gear 51a of the fifth-speed gear train G5 by its dowel. This causes transmission of power from the inner shaft 47a to the countershaft 48 via the fifth-speed gear train G5. Thus, the fifth speed stage is established.

On the other hand, while the second shifter 54 stops at the initial position, and the driving gear 53a and the driven gear 53b of the third-speed gear train G3 mesh with each other, the first shifter 52 may move in a second direction DR2 opposite to the first direction DR1, from the neutral position. At this time, the engagement between the driving gear 51a and the driven gear 51b is released, and the first shifter 52 is coupled to the driven gear 53b of the third-speed gear train G3 by its dowel. This causes transmission of power from the inner shaft 47a to the countershaft 48 via the third-speed gear train G3. Thus, the third speed stage is established.

The second-speed gear train G2 includes a driving gear 55a and a driven gear 55b. The driving gear 55a is coaxially fixed to the sleeve 47b. The driven gear 55b is coaxially fitted to the countershaft 48 in a relatively rotatable manner and meshes with the driving gear 55a. The driving gear 55a is integrally formed with the sleeve 47b into one body. The driven gear 55b is coupled to the countershaft 48 in a manner relatively non-displaceable in the axial direction of the countershaft 48.

The sixth-speed gear train G6 includes a driving gear 56a and a driven gear 56b. The driving gear 56a is coaxially fitted to the sleeve 47b in a relatively rotatable manner. The driven gear 56b is coaxially joined to the countershaft 48 in a relatively non-rotatable manner and meshes with the driving gear 56a. The driving gear 56a is supported by the sleeve 47b in a manner non-displaceable in the axial direction of the sleeve 47b. The driven gear 56b is joined to a third shifter 57 that is joined to the countershaft 48 by a spline in a manner relatively displaceable in the axial direction. Upon moving in the second direction DR2 from the neutral position, the third shifter 57 is coupled to the driven gear 55b of the second-speed gear train G2 by its dowel. This causes transmission of power from the sleeve 47b to the countershaft 48 via the second-speed gear train G2. Thus, the second speed stage is established.

The fourth-speed gear train G4 includes a driving gear 58a and a driven gear 58b. The driving gear 58a is coaxially joined to the sleeve 47b in a relatively non-rotatable manner. The driven gear 58b is coaxially fitted to the countershaft 48 in a relatively rotatable manner. The driving gear 58a is joined to a fourth shifter 59 that is joined to the sleeve 47b by a spline in a manner relatively displaceable in the axial direction. The driven gear 58b is coupled to the countershaft 48 in a manner relatively non-displaceable in the axial direction of the countershaft 48. Upon moving in the second direction DR2 from an initial position, the fourth shifter 59 is coupled to the driving gear 56a of the sixth-speed gear train G6 by its dowel. This causes transmission of power from the sleeve 47b to the countershaft 48 via the sixth-speed gear train G6. Thus, the sixth speed stage is established.

On the other hand, while the fourth shifter 59 stops at the initial position, and the driving gear 58a and the driven gear 58b of the fourth-speed gear train G4 mesh with each other, the third shifter 57 may move in the first direction DR1 from the neutral position. At this time, the third shifter 57 is coupled to the driven gear 58b of the fourth-speed gear train G4 by its dowel. This causes transmission of power from the sleeve 47b to the countershaft 48 via the fourth-speed gear train G4. Thus, the fourth speed stage is established.

Figure 4:
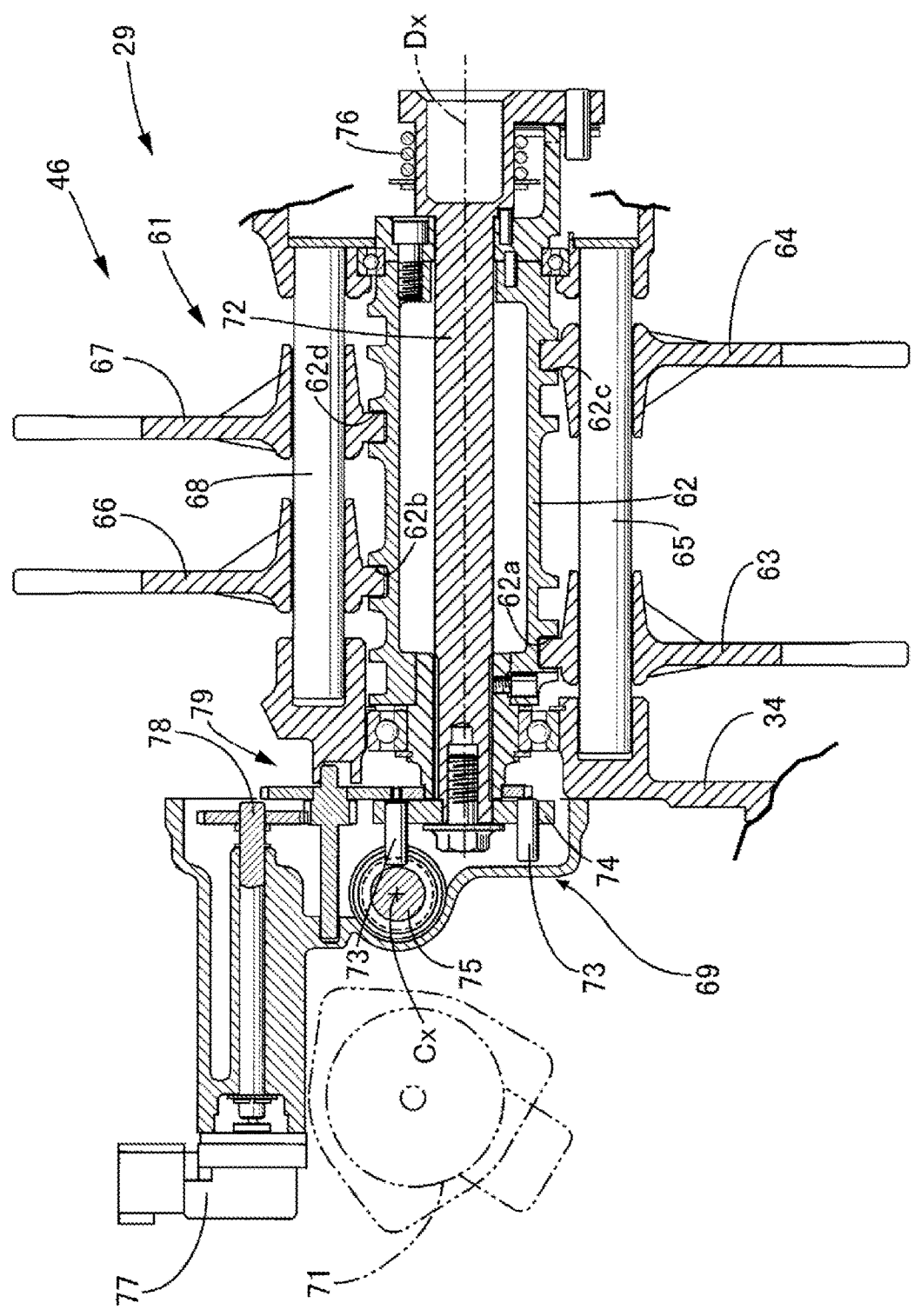
FIG. 4 is an enlarged sectional view of a gear shift control unit cut at a cross section containing a rotation axis of a shift drum (First Embodiment).

As shown in FIG. 4, the transmission 46 includes a gear shift control unit 61 for sequentially switching the speed stages among the neutral stage, the first speed stage, the second speed stage, the third speed stage, the fourth speed stage, the fifth speed stage, and the sixth speed stage. The gear shift control unit 61 includes a shift drum 62, a first guide shaft 65, and a second guide shaft 68. The shift drum 62 rotates on a rotation axis Dx parallel to the shaft centers of the main shaft 47 and the countershaft 48. The first guide shaft 65 guides displacement of a first shift fork 63 and a third shift fork 64 in parallel to the rotation axis Dx of the shift drum 62. The second guide shaft 68 guides displacement of a second shift fork 66 and a fourth shift fork 67 in parallel to the rotation axis Dx of the shift drum 62. The shift drum 62 includes a first cam groove 62a, a second cam groove 62b, a third cam groove 62c, and a fourth cam groove 62d that are formed on an outer circumferential surface. The first cam groove 62a engages with the first shift fork 63 and displaces the first shift fork 63 along the first guide shaft 65 in accordance with rotation of the shift drum 62. The second cam groove 62b engages with the second shift fork 66 and displaces the second shift fork 66 along the second guide shaft 68 in accordance with rotation of the shift drum 62. The third cam groove 62c engages with the third shift fork 64 and displaces the third shift fork 64 along the first guide shaft 65 in accordance with rotation of the shift drum 62. The fourth cam groove 62d engages with the fourth shift fork 67 and displaces the fourth shift fork 67 along the second guide shaft 68 in accordance with rotation of the shift drum 62.

As shown in FIG. 3, the first shift fork 63 is coupled to the first shifter 52 in a manner relatively rotatable around the countershaft 48. Displacement of the first shift fork 63 in accordance with rotation of the shift drum 62 causes displacement in the axial direction of the first shifter 52 on the countershaft 48. The second shift fork 66 is coupled to the second shifter 54 in a manner relatively rotatable around the inner shaft 47a. Displacement of the second shift fork 66 in accordance with rotation of the shift drum 62 causes axial displacement of the second shifter 54 on the inner shaft 47a. The third shift fork 64 is coupled to the third shifter 57 in a manner relatively rotatable around the countershaft 48. Displacement of the third shift fork 64 in accordance with rotation of the shift drum 62 causes axial displacement of the third shifter 57 on the countershaft 48. The fourth shift fork 67 is coupled to the fourth shifter 59 in a manner relatively rotatable around the sleeve 47b. Displacement of the fourth shift fork 67 in accordance with rotation of the shift drum 62 causes axial displacement of the fourth shifter 59 on the inner shaft 47b.

As shown in FIG. 4, the shift drum 62 is coupled to an electric motor 71 via a power transmission mechanism 69. The power transmission mechanism 69 includes a power transmission shaft 72, a rotation body 74, and a barrel cam 75. The power transmission shaft 72 coaxially penetrates through the center of the shift drum 62. The rotation body 74 is joined to an end of the power transmission shaft 72 and includes engaging pins 73 that are arranged at an equal interval around the rotation axis Dx of the power transmission shaft 72. The barrel cam 75 rotates on a rotation axis Cx that is disposed in an imaginary plane orthogonal to the rotation axis Dx of the power transmission shaft 72, and the barrel cam 75 engages with the engaging pins 73 to cause the power transmission shaft 72 to rotate, in accordance with rotation on the rotation axis Cx. A driving force is transmitted from the electric motor 71 to the barrel cam 75 via the reduction gear mechanism 69.

The shift drum 62 is coupled to the power transmission shaft 72 by a lost motion spring 76. The lost motion spring 76 is composed of a torsion spring that is wound around the power transmission shaft 72 to exert elastic force around the power transmission shaft 72. The shift drum 62 follows rotation of the power transmission shaft 72 by the elastic force of the lost motion spring 76.

The shift drum 62 is coupled to a shift sensor 77 that measures a rotation angle of the shift drum 62. The shift sensor 77 measures rotation of a measuring shaft 78 that rotates on an axis parallel to the rotation axis Dx of the shift drum 62. Rotation is transmitted from the shift drum 62 to the measuring shaft 78 via a reduction gear train 79.

As shown in FIG. 3, the main shaft 47 is coupled to a first clutch 82a and a second clutch 82b that share a clutch outer 81. The clutch outer 81 is formed into a cylindrical body that is coaxially with the main shaft 47. The clutch outer 81 is joined to a driven gear 83 via a damper spring 84. The driven gear 83 is coaxially supported on the sleeve 47b in a relatively rotatable manner. The driven gear 83 meshes with the driving gear 43 on the crankshaft 33. Power of the crankshaft 33 is transmitted to the clutch outer 81 via the driving gear 43 and the driven gear 83.

The first clutch 82a includes a first clutch inner 85, a pressing body 86, driving friction plates 87, and driven friction plates 88. The first clutch inner 85 is coaxially surrounded by the clutch outer 81 and is joined to the inner shaft 47a in a relatively non-rotatable manner. The pressing body 86 axially faces a pressure receiving plate of the first clutch inner 85 and is supported on the first clutch inner 85 in a manner displaceable in the axial direction of the inner shaft 47a. The driving friction plates 87 are interposed between the pressure receiving plate and the pressing body 86 and are coupled to the clutch outer 81 in an axially displaceable but relatively non-rotatable manner. The driven friction plates 88 are axially arranged alternately with the driving friction plates 87 and are coupled to the first clutch inner 85 in an axially displaceable but relatively non-rotatable manner.

A hydraulic chamber 89 is formed over the first clutch inner 85 and generates oil pressure that displaces the pressing body 86 toward the pressure receiving plate. A spring 91 is interposed between the first clutch inner 85 and the pressing body 86 and applies elastic force to the pressing body 86 in a direction of reducing the capacity of the hydraulic chamber 89 in accordance with reduced pressure in the hydraulic chamber 89. In response to oil pressure generated in the hydraulic chamber 89, the pressing body 86 is driven toward the pressure receiving plate, and the driving friction plates 87 and the driven friction plates 88 come into close contact with one another, whereby an engaged state of the first clutch 82*a* is established. Thus, power is transmitted from the crankshaft 33 to the inner shaft 47*a*. In response to release of oil pressure in the hydraulic chamber 89, the pressing body 86 comes away from the pressure receiving plate by the elastic force of the spring 91, and the close contact between the driving friction plates 87 and the driven friction plates 88 is released, whereby a disengaged state of the first clutch 82*a* is established.

The second clutch 82*b* includes a second clutch inner 92, a pressing body 93, driving friction plates 94, and driven friction plates 95. The second clutch inner 92 is coaxially surrounded by the clutch outer 81 and is joined to the sleeve 47*b* in a relatively non-rotatable manner. The pressing body 93 axially faces a pressure receiving plate of the second clutch inner 92 and is supported on the second clutch inner 92 in a manner displaceable in the axial direction of the sleeve 47*b*. The driving friction plates 94 are interposed between the pressure receiving plate and the pressing body 93 and are coupled to the clutch outer 81 in an axially displaceable but relatively non-rotatable manner. The driven friction plates 95 are axially arranged alternately with the driving friction plates 94 and are coupled to the second clutch inner 92 in an axially displaceable but relatively non-rotatable manner.

A hydraulic chamber 96 is formed over the second clutch inner 92 and generates oil pressure that displaces the pressing body 93 toward the pressure receiving plate. A spring 97 is interposed between the second clutch inner 92 and the pressing body 93 and applies elastic force to the pressing body 93 in a direction of reducing the capacity of the hydraulic chamber 96 in accordance with reduced pressure in the hydraulic chamber 96. In response to oil pressure generated in the hydraulic chamber 96, the pressing body 93 is driven toward the pressure receiving plate, and the driving friction plates 94 and the driven friction plates 95 come into close contact with one another, whereby an engaged state of the second clutch 82*b* is established. Thus, power is transmitted from the crankshaft 33 to the sleeve 47*b*. In response to release of oil pressure in the hydraulic chamber 96, the pressing body 93 comes away from the pressure receiving plate by the elastic force of the spring 97, and the close contact between the driving friction plates 94 and the driven friction plates 95 is released, whereby a disengaged state of the second clutch 82*b* is established.

A driving bevel gear 98 is coaxially fixed to the countershaft 48 on the outside of the crankcase 34. The driving bevel gear 98 engages with a driven bevel gear 99 that rotates on an axis orthogonal to the rotation axis of the countershaft 48. The driven bevel gear 99 is integrally formed with an output shaft 101 into one body. The output shaft 101 is coupled to the drive shaft 31.

Figure 5:
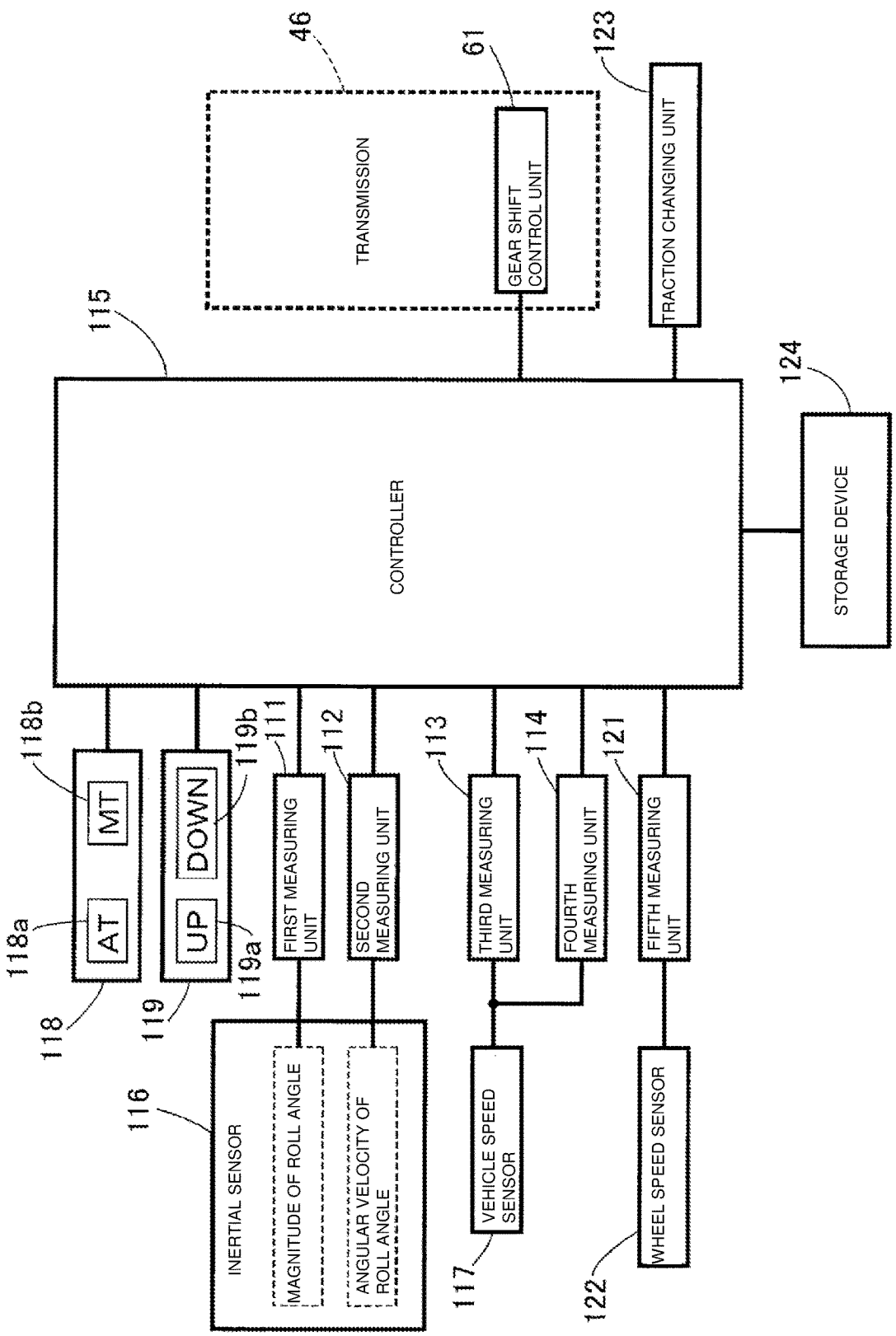
FIG. 5 is a block diagram schematically showing a configuration of a control system of the motorcycle (First Embodiment).

As shown in FIG. 5, the motorcycle 11 includes a first measuring unit 111, a second measuring unit 112, a third measuring unit 113, a fourth measuring unit 114, and a controller 115. The first measuring unit 111 measures the magnitude of the roll angle of the vehicle body. The second measuring unit 112 measures the angular velocity of the roll angle of the vehicle body. The third measuring unit 113 measures the vehicle speed. The fourth measuring unit 114 measures acceleration in the advance direction of the vehicle body. The controller 115 controls movement of the transmission 46 based on magnitude of the roll angle, angular velocity of the roll angle, vehicle speed, and acceleration in the advance direction.

An inertial sensor 116 (for example, gyroscope sensor) is connected to both of the first measuring unit 111 and the second measuring unit 112. The inertial sensor 116 is, for example, connected to the engine 32 while being disposed on an upper surface of an air cleaner that filters air supplied to the combustion chamber 39. The inertial sensor 116 measures the roll angle of the vehicle body and angular velocity of the roll angle in accordance with inclination in the right-left direction of the vehicle body. The inertial sensor 116 supplies a signal for determining the magnitude of the roll angle, to the first measuring unit 111. The inertial sensor 116 supplies a signal for determining the angular velocity of the roll angle, to the second measuring unit 112. The roll angle corresponds to a rotation angle around an axis horizontally extending in the front-rear direction of the vehicle body while passing through the center of gravity of the vehicle body. The first measuring unit 111 and the second measuring unit 112 are configured to function as input ports of the controller 115.

The third measuring unit 113 and the fourth measuring unit 114 are connected to a vehicle speed sensor 117 in a shared manner, for example. The vehicle speed sensor 117 measures the vehicle speed, for example, based on a rotation speed of the front wheel WF. The vehicle speed sensor 117 supplies a signal for determining the vehicle speed, to the third measuring unit 113. The fourth measuring unit 114 calculates acceleration in the advance direction, for example, based on a differential value of the vehicle speed. The third measuring unit 113 and the fourth measuring unit 114 are configured to function as input ports of the controller 115.

The controller 115 is connected to a mode switch 118 and a shift switch 119. The mode switch 118 is operated in order to switch between full-automatic gear shifting and semi-automatic gear shifting, for example. The shift switch 119 is operated in order to select the speed stage in the semi-automatic gear shifting. Herein, in response to operation to an "AT" button 118*a* of the mode switch 118, the controller 115 selects the full-automatic gear shifting. The transmission 46 then automatically shifts up or down based on the vehicle speed and the acceleration in the advance direction. This eliminates the need for a driver to operate the clutch and shift gears in order to shift gears. In response to operation to an "MT" button 118*b* of the mode switch 118, the controller 115 selects the semi-automatic gear shifting. In the semi-automatic gear shifting, the transmission 46 shifts up in accordance with operation to an "UP" button 119*a* of the shift switch 119 and shifts down in accordance with operation to a "DOWN" button 119*b* of the shift switch 119. This eliminates the need for a driver to operate the clutch in order to shift gears. The mode switch 118 and the shift switch 119 can be mounted, for example, on the steering handlebar 25 in a range reachable by a finger of a hand that is gripping the steering handlebar 25.

The controller 115 is connected to a fifth measuring unit 121 that measures the wheel speed of the rear wheel WR. The fifth measuring unit 121 is connected to a wheel speed sensor 122 that measures the rotation speed of the rear wheel WR. The wheel speed sensor 122 supplies a signal for determining the rotation speed of the rear wheel WR, to the fifth measuring unit 121.

The controller 115 is connected to a traction changing unit 123 that adjusts traction of the rear wheel WR. The traction changing unit 123 can be composed of, for example, a throttle valve of the engine 31 or a break system of the rear wheel WR. The traction changing unit 123 suppresses traction of the rear wheel WR. The controller 115 is configured to control operation of the traction changing unit 123 based on the vehicle speed and the wheel speed of the rear wheel WR.

Figure 6:
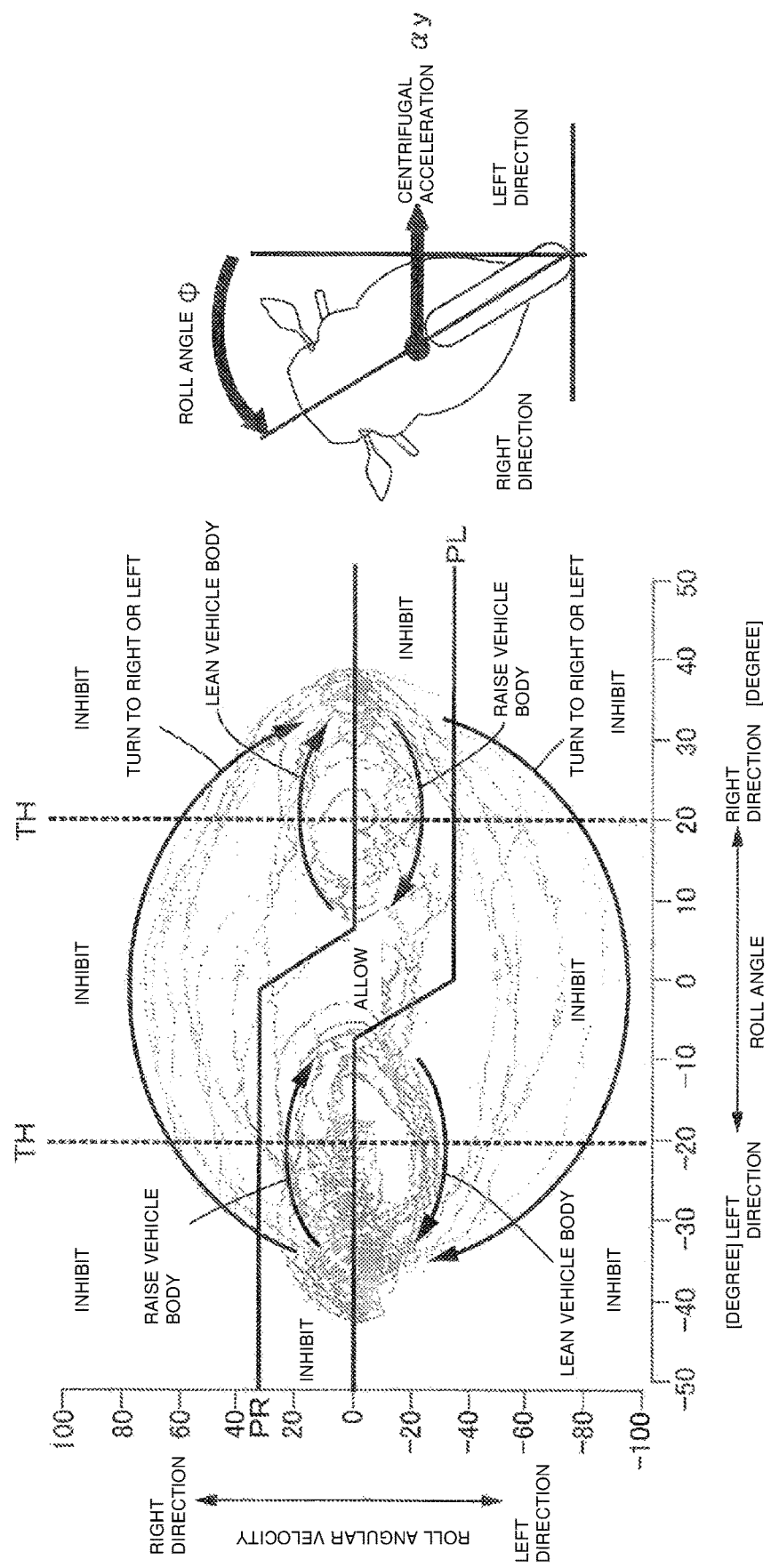
FIG. 6 is a graph showing a two-dimensional distribution of a roll angle and an angular velocity of the roll angle of a motorcycle actually measured (First Embodiment).

The controller 115 is connected to a storage device 124. The storage device 124 stores a map that specifies an angular velocity for inhibiting shifting gears of the transmission 46 with respect to each magnitude of the roll angle. Herein, as shown in FIG. 6, the roll angle is 0 degrees at a neutral position (upright position) of the vehicle body. As the vehicle body is leaned from the neutral position to the right, the roll angle increases in positive value. As the vehicle body is leaned from the neutral position to the left, the roll angle increases in negative value. The map shows that the transmission 46 is inhibited from shifting gears in the state in which the angular velocity of the roll angle is a positive value (acceleration for leaning to the right is generated) while the roll angle is in a positive value range. The transmission 46 is inhibited from shifting gears in the state in which the angular velocity of the roll angle is a negative value (acceleration for leaning to the left is generated) while the roll angle is in a negative value range. Similarly, the map shows that the transmission 46 is inhibited from shifting gears in the state in which the angular velocity of the roll angle exceeds a reference value PL of a negative value while the roll angle is in the positive value range. The transmission 46 is inhibited from shifting gears in the state in which the angular velocity of the roll angle exceeds a reference value PR of a positive value while the roll angle is in the negative value range. The transmission 46 is inhibited from shifting gears in the state in which the absolute value of the roll angle exceeds a threshold value TH.

FIG. 6 shows a two-dimensional distribution of a roll angle and an angular velocity of the roll angle actually measured when the motorcycle 11 is driving. The angular velocity is considered to reach the maximum at the neutral position, which is determined by the roll angle, in turning to the right or the left in such a manner that the vehicle body is leaned from a right bank state to a left bank state or from the left bank state to the right bank state. In contrast, the angular velocity is considered to converge to zero at the neutral position, which is determined by the roll angle, in "leaning" from the neutral position to the right or the left and in "raising the vehicle body" so as to return from the inclined position to the neutral position. The threshold value TH of the roll angle, and the reference values PL and PR of the angular velocity, can be set based on a two-dimensional distribution of the roll angle and the angular velocity actually measured.

In order to establish the first speed stage, the controller 115 supplies a driving signal to the electric motor 71 of the gear shift control unit 61. Upon being supplied with the driving signal, the electric motor 71 drives the shift drum 62 around the rotation axis Dx. The first shift fork 63 is displaced along the first guide shaft 65 in accordance with rotation of the shift drum 62. The first shifter 52 is displaced in the first direction DR1 from the neutral position, on the countershaft 48. As a result, the first shifter 52 is connected to the driven gear 49b of the first-speed gear train G1. In accordance with meshing between the driving gear 49a and the driven gear 49b of the first-speed gear train G1, the rotation is transmitted from the inner shaft 47a to the countershaft 48. At this time, oil pressure is supplied to the hydraulic chamber 89 of the first clutch 82a. The pressing body 86 comes close to the pressure receiving plate in the first direction DR1, over the first clutch inner 85. The driving friction plates 87 and the driven friction plates 88 are brought into close contact with one another. Thus, the clutch outer 81 and the inner shaft 47a are connected around the rotation axis. The first clutch 82a is engaged. The first speed stage is established in the engine 32.

In order to shift up to the second speed stage, the controller 115 supplies a driving signal to the electric motor 71 of the gear shift control unit 61. Upon being supplied with the driving signal, the electric motor 71 drives the shift drum 62 around the rotation axis Dx. The third shift fork 64 is displaced along the first guide shaft 65 in accordance with rotation of the shift drum 62. The third shifter 57 is displaced in the second direction DR2 from the neutral position, on the countershaft 48. As a result, the third shifter 57 is connected to the driven gear 55b of the second-speed gear train G2. In accordance with meshing between the driving gear 55a and the driven gear 55b of the second-speed gear train G2, the rotation is transmitted from the sleeve 47b to the countershaft 48.

At this time, pressure is reduced in the hydraulic chamber 89 of the first clutch 82a, whereas oil pressure is supplied to the hydraulic chamber 96 of the second clutch 82b. The pressing body 86 comes away from the pressure receiving plate in the second direction DR2, over the first clutch inner 85. The pressing body 93 comes close to the pressure receiving plate in the first direction DR1, over the second clutch inner 92. Thus, the clutch outer 81 is disconnected from the inner shaft 47a, but is connected to the sleeve 47b around the rotation axis. The first clutch 82a is disengaged, whereas the second clutch 82b is engaged. The second speed stage is established in the engine 32. Similarly, in accordance with driving of the electric motor 71, and engagement and disengagement of the first clutch 82a and the second clutch 82b, shifting up or down of the transmission 46 is performed. The transmission 46 transmits power from the main shaft 47 to the countershaft 48 while automatically shifting gears between the main shaft 47 (driving shaft) and the countershaft 48 (driven shaft).

Next, operation of the motorcycle according to this embodiment will be described. In response to operation to the "AT" button 118a of the mode switch 118, the controller 115 establishes an automatic gear shifting mode based on a signal supplied from the "AT" button 118a. In the automatic gear shifting mode, the controller 115 determines shifting up or down of the transmission 46 based on the vehicle speed, the throttle opening, and the acceleration in the advance direction. In order to determine shifting up, the controller 115 refers to the magnitude and the angular velocity of the roll angle. This makes it possible for a driver to enjoy riding without being concerned about shifting up and down.

During driving on a straight road, an absolute value of the roll angle is maintained at or smaller than a threshold value. Thus, the controller 115 executes shifting up or down of the transmission 46 based on the vehicle speed, the throttle opening, and the acceleration in the advance direction. A driver can enjoy riding without having an excessive holding feeling in acceleration.

In driving a corner with a curvature greater than a specific value, the controller 115 detects a roll angle exceeding the threshold TH in a direction of leaning from the neutral position (roll angle=0 degrees) of the vehicle body. The controller 115 determines that the motorcycle 11 is cornering, based on the magnitude of the roll angle. At this time, the controller 115 inhibits shifting up of the transmission 46. The speed stage of the transmission 46 is maintained during cornering. Shifting up of the transmission 46 is thus inhibited during cornering, whereby driving feeling of the motorcycle 11 is improved.

At the time of entering a corner or turning to the right or the left, angular velocity of the roll angle is generated in the direction of leaning from the neutral position of the vehicle body. The controller 115 detects a positive angular velocity in a range of positive roll angle. Alternatively, the controller 115 detects a negative angular velocity in a range of negative roll angle. The controller 115 compares the magnitude and the angular velocity of the roll angle with the map of the storage device 124. As a result, the controller 115 inhibits shifting up of the transmission 46. Thus, shifting up of the transmission 46 is inhibited at the time the vehicle body is leaned, whereby driving feeling of the motorcycle 11 is improved.

In turning to the right or the left, angular velocity of the roll angle is generated in the direction from the inclined position to the neutral position of the vehicle body. The controller 115 detects a negative angular velocity greater than the reference value PL in the range of positive roll angle. Alternatively, the controller 115 detects a positive angular velocity greater than the reference value PR in the range of negative roll angle. The controller 115 compares the magnitude and the angular velocity of the roll angle with the map of the storage device 124. As a result, the controller 115 inhibits shifting up of the transmission 46. Thus, shifting up of the transmission 46 is inhibited at the time of turning to the right or the left, whereby driving feeling of the motorcycle 11 is improved.

At the time of changing from corner driving to straight driving, or the like, angular velocity of the roll angle is generated in the direction from the inclined position to the neutral position of the vehicle body. This angular velocity is lower than the angular velocity at the time of turning to the right or the left. The controller 115 detects a negative angular velocity that is at or lower than the reference value PL in the range of positive roll angle. Alternatively, the controller 115 detects a positive angular velocity that is at or lower than the reference value PR in the range of negative roll angle. The controller 115 compares the magnitude and the angular velocity of the roll angle with the map of the storage device 124. As a result, the controller 115 allows shifting up of the transmission 46. In the condition that shifting up is performed, it is possible to accelerate the motorcycle 11 immediately after the motorcycle 11 passes through a corner. The driving feeling of the motorcycle 11 is thus improved. A driver can enjoy riding more.

In response to operation to the "MT" button 118b of the mode switch 118, the controller 115 establishes a semi-automatic gear shifting mode based on a signal supplied from the "MT" button 118b. In the semi-automatic gear shifting mode, the controller 115 determines shifting up or down of the transmission 46 based on operation to the shift switch 119. This makes it possible for a driver to enjoy riding without being concerned about clutch operation in shifting gears. The semi-automatic gear shifting mode does not inhibit shifting gears based on the magnitude and the angular velocity of the roll angle. That is, the intention of a driver is most preferentially reflected.

Figure 7:
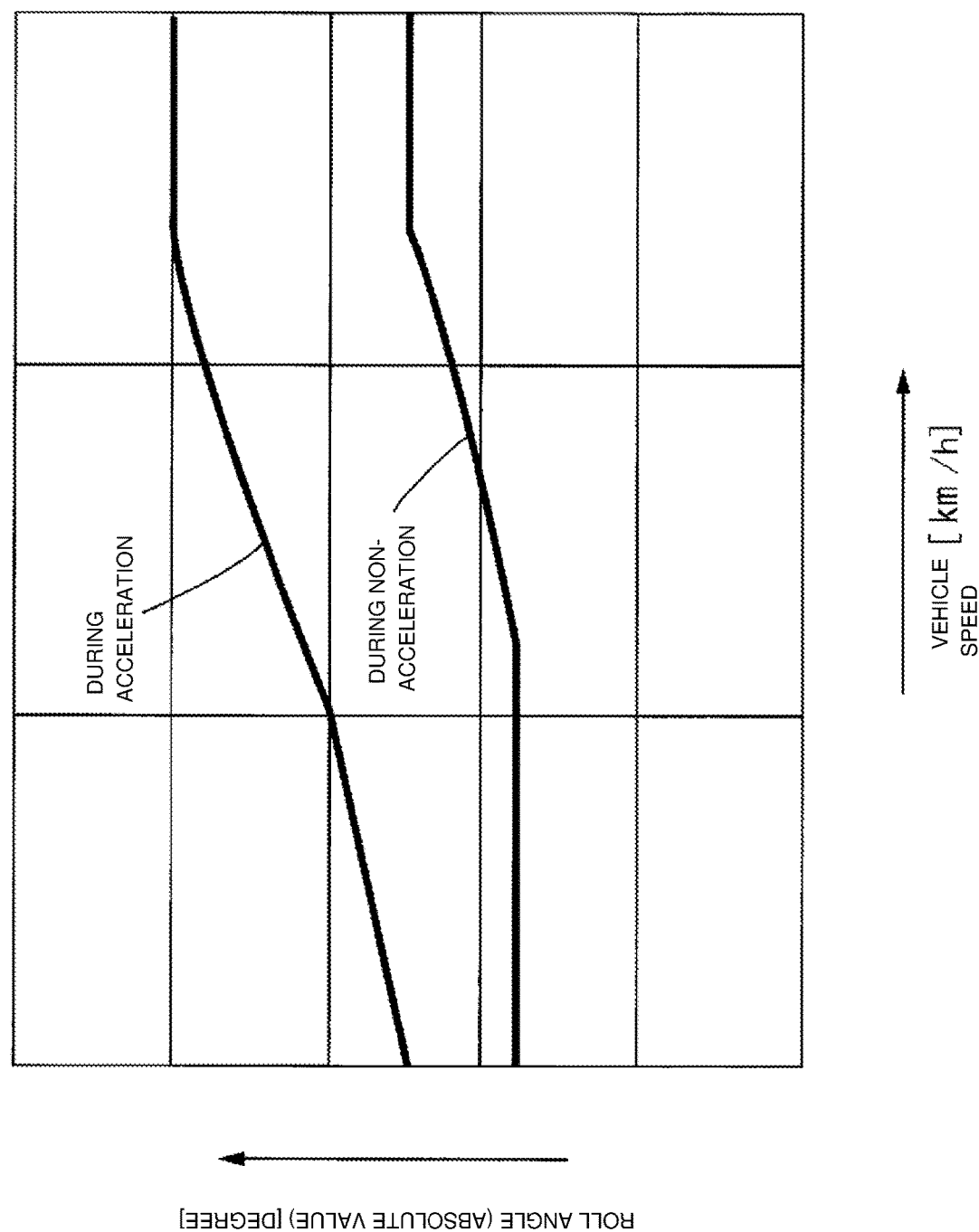
FIG. 7 is a graph showing change in threshold value of the roll angle (First Embodiment).

As shown in FIG. 7, the threshold value TH of the absolute value of the roll angle is changed in accordance with the magnitude of acceleration in the advance direction. Herein, the threshold value TH is switched between at acceleration and at non-acceleration. The acceleration and the non-acceleration can be distinguished by a predetermined threshold value. During acceleration, the threshold value TH of the absolute value of the roll angle is set large. In addition, the threshold value TH of the absolute value of the roll angle is set large in accordance with increase in the vehicle speed. The transmission 46 executes shifting up on the condition that the vehicle is ready to accelerate even during cornering. Thus, an excessive holding feeling is not caused by the speed stage.

The controller 115 changes the degree of intervention of traction control based on the roll angle and the angular velocity of the roll angle. In order to change the degree of intervention, the controller 115 estimates a friction coefficient $\mu$ of a road surface based on the magnitude and the angular velocity of the roll angle. In the state in which the friction coefficient $\mu$ is low, a threshold value that is obtained from the difference between the vehicle speed and the wheel speed of the rear wheel WR, is set small. In addition, the degree of deceleration of the rear wheel WR is increased. As a result, when a road surface is slippery, which can cause the rear wheel WR to have great acceleration at spinning, traction control is executed early, whereby increase of spinning of the rear wheel WR can be suppressed. On the other hand, when the friction coefficient $\mu$ of a road surface is high, early intervention of traction control tends to provide a driver with an uncomfortable feeling with respect to acceleration operation. In view of this, the degree of intervention is reduced, whereby a natural driving feeling can be provided. As shown in FIG. 8, the controller 115 distinguishes among a dry road surface having a first friction coefficient, a slightly wet road surface having a second friction coefficient lower than the first friction coefficient, and a wet road surface having a third friction coefficient lower than the second friction coefficient, based on the distribution of the roll angle and the angular velocity.

In the motorcycle 11 of this embodiment, shifting gears is controlled by referring to the magnitude of the roll angle in addition to the angular velocity of the roll angle so as to distinguish between the following states: states of leaning to the right or the left (forming bank) and turning to the right or the left, and a state of returning from an inclined position to a neutral position. The transmission is thus controlled with detailed response to the situation of the vehicle body. The driving feeling of the motorcycle 11 is thus improved. A driver can enjoy riding more.

The controller 115 of this embodiment inhibits the transmission 46 from shifting gears, upon detecting an angular velocity in the direction of leaning from the neutral position of the vehicle body. At the time of entering a corner or turning to the right or the left, angular velocity of the roll angle is generated in the direction of leaning from the neutral position of the vehicle body. In such a case, shifting up of the transmission 46 is desired to be inhibited. Inhibiting shifting up of the transmission 46 at the time the vehicle body is leaned, improves driving feeling of the motorcycle 11.

The roll angle of a vehicle body depends on acceleration of the center of gravity in the right-left direction of a vehicle. Thus, for example, as the roll angle of a motorcycle is larger at the time of cornering, acceleration at the center of gravity in the right-left direction of the vehicle increases. The controller 115 inhibits the transmission 46 from shifting gears, upon detecting a roll angle larger than the threshold value TH in the direction of leaning from the neutral position of the vehicle body. In the state in which the roll angle exceeds the threshold value TH in the direction of leaning from the neutral position of the vehicle body, the motorcycle 11 is determined as being cornering. Shifting up of the transmission 46 is desired to be inhibited during cornering. Thus, shifting up of the transmission 46 is inhibited during cornering, whereby driving feeling of the motorcycle 11 is improved.

In this embodiment, the controller 115 changes the threshold value TH in accordance with the magnitude of acceleration in the advance direction. The transmission 46 executes shifting up even during cornering while the vehicle is being accelerated, whereby an excessive holding feeling is eliminated.

The controller 115 inhibits the transmission 46 from shifting gears, upon detecting an angular velocity exceeding the reference value PL or PR in the direction of returning from an inclined position to the neutral position. In order to turn to the right or the left, a great angular velocity exceeding the reference value PL or PR is generated in returning from the inclined position to the neutral position of the vehicle body. In turning to the right or the left, shifting gears of the transmission 46 is desired to be inhibited. On the other hand, at the time of changing from winding driving to straight driving, or the like, angular velocity of the roll angle remains at a value at or lower than the reference value PL or PR, in returning from the inclined position to the neutral position of the vehicle body. On the condition that shifting up is performed at this time, it is possible to accelerate the motorcycle 11 immediately after winding driving. The driving feeling of the motorcycle 11 is thus improved. A driver can enjoy riding more.

The motorcycle 11 of this embodiment includes the storage device 124 that stores the map which specifies the angular velocity for inhibiting shifting gears of the transmission 46 with respect to each magnitude of the roll angle. The magnitude and the angular velocity of the roll angle for inhibiting shifting up of the transmission 46 are uniquely represented in numbers, which simplifies execution of control for inhibiting shifting gears of the transmission 46.

In this embodiment, the inertial sensor 116 measures the magnitude and the angular velocity of the roll angle. Inhibition of shifting up is controlled based on information that is obtained by the single inertial sensor 116, and therefore, the configuration of the gear shift control unit 61 can be simplified.

The controller 115 changes the degree of intervention of traction control based on the roll angle and the angular velocity of the roll angle. The road surface condition can be predicted based on the magnitude and the angular velocity of the roll angle. The traction control is executed in accordance with the predicted road surface condition. This improves driving feeling of the motorcycle 11. A driver can enjoy riding more.

In another case, the controller 115 may refer to the number of revolution of the engine 32 in order to inhibit shifting up. In this case, the controller 115 cancels the inhibition of shifting gears, in a state in which the engine speed exceeds a predetermined value. Although the conditions for inhibiting shifting gears are satisfied, shifting up is executed in the state in which the engine speed is high. This improves driving feeling of the motorcycle.

The threshold value TH may be changed based on a cornering radius that is estimated from a centrifugal acceleration ay and a vehicle speed. In a case in which the estimated cornering radius is determined as being smaller than a predetermined value, the controller 115 may inhibit shifting gears. Thus, shifting gears is inhibited also at the time of fine cornering, whereby maneuverability of the vehicle body is improved.

The invention claimed is:

1. A motorcycle comprising:
 a transmission configured to automatically shift gears between a driving shaft and a driven shaft to transmit power from the driving shaft to the driven shaft;
 a first measuring unit configured to measure a magnitude of a roll angle of a vehicle body;
 a second measuring unit configured to measure an angular velocity of the roll angle of the vehicle body; and
 a controller configured to inhibit the transmission from shifting gears, based on the magnitude and the angular velocity of the roll angle,
 wherein the controller is configured to allow shifting gears, upon detecting the angular velocity being equal to or less than a reference value in a direction of returning from an inclined position to a neutral position of the vehicle body.

2. The motorcycle according to claim 1, wherein the controller is configured to inhibit the transmission from shifting gears, upon detecting the angular velocity in a direction of leaning a from the neutral position of the vehicle body.

3. The motorcycle according to claim 2, wherein the controller is configured to inhibit the transmission from shifting gears, upon detecting the roll angle exceeding a threshold value in the direction of leaning from the neutral position of the vehicle body.

4. The motorcycle according to claim 3, wherein the controller is configured to inhibit the transmission from shifting gears, upon detecting the angular velocity exceeding a reference value in the direction of returning from the inclined position to the neutral position of the vehicle body.

5. The motorcycle according to claim 3, further comprising a storage device that stores a map which specifies the angular velocity for inhibiting shifting gears of the transmission with respect to each magnitude of the roll angle.

6. The motorcycle according to claim 3, further comprising an inertial sensor that measures the magnitude and the angular velocity of the roll angle.

7. The motorcycle according to claim 2, wherein the controller is configured to inhibit the transmission from shifting gears, upon detecting the angular velocity exceeding a reference value in the direction of returning from the inclined position to the neutral position of the vehicle body.

8. The motorcycle according to claim 2, further comprising a storage device that stores a map which specifies the angular velocity for inhibiting shifting gears of the transmission with respect to each magnitude of the roll angle.

9. The motorcycle according to claim 2, further comprising an inertial sensor that measures the magnitude and the angular velocity of the roll angle.

10. The motorcycle according to claim 1, wherein the controller is configured to inhibit the transmission from shifting gears, upon detecting the angular velocity exceeding a reference value in the direction of returning from the inclined position to the neutral position of the vehicle body.

11. The motorcycle according to claim 10, further comprising a storage device that stores a map which specifies the angular velocity for inhibiting shifting gears of the transmission with respect to each magnitude of the roll angle.

12. The motorcycle according to claim 10, further comprising an inertial sensor that measures the magnitude and the angular velocity of the roll angle.

13. The motorcycle according to claim 1, further comprising a storage device that stores a map which specifies the angular velocity for inhibiting shifting gears of the transmission with respect to each magnitude of the roll angle.

14. The motorcycle according to claim 1, further comprising an inertial sensor that measures the magnitude and the angular velocity of the roll angle.

15. The motorcycle according to claim 1, wherein the controller is configured to change a degree of intervention of traction control, based on the roll angle and the angular velocity.

16. The motorcycle according to claim 1, wherein the controller is configured to cancel the inhibition of shifting gears, in a state in which an engine speed exceeds a predetermined value.

17. A motorcycle comprising:
- a transmission configured to automatically shift gears between a driving shaft and a driven shaft to transmit power from the driving shaft to the driven shaft;
- a first measuring unit configured to measure a magnitude of a roll angle of a vehicle body;
- a second measuring unit configured to measure an angular velocity of the roll angle of the vehicle body; and
- a controller configured to inhibit the transmission from shifting gears, based on the magnitude and the angular velocity of the roll angle,
- wherein the magnitude of the roll angle for inhibiting the transmission from shifting gears is changed in accordance with a degree of acceleration of the motorcycle in an advance direction of the motorcycle.

18. The motorcycle according to claim 17, wherein the controller is configured to inhibit the transmission from shifting gears, upon detecting the angular velocity exceeding a reference value in a direction of returning from an inclined position to a neutral position of the vehicle body.

19. The motorcycle according to claim 17, further comprising a storage device that stores a map which specifies the angular velocity for inhibiting shifting gears of the transmission with respect to each magnitude of the roll angle.

20. The motorcycle according to claim 17, further comprising an inertial sensor that measures the magnitude and the angular velocity of the roll angle.

\* \* \* \* \*